United States Patent [19]

Hooper et al.

[11] 4,216,928

[45] Aug. 12, 1980

[54] MICROWAVE RADIOMETRIC ATTITUDE REFERENCE SYSTEM

[75] Inventors: John O. Hooper; W. James Stone; Vernon D. Burklund, all of Ridgecrest, Calif.

[73] Assignee: The United States of America as represented by the Secretary of the Navy, Washington, D.C.

[21] Appl. No.: 892,054

[22] Filed: Mar. 31, 1978

[51] Int. Cl.² ............................................. B64D 25/10
[52] U.S. Cl. ....................... 244/122 AD; 244/122 A; 250/349; 364/454
[58] Field of Search ........ 244/122 A, 122 AB, 122 R, 244/122 AC, 122 AD, 122 AE, 141, 171, 164, 318, 319, 321, 169; 250/342, 349; 364/434, 449, 454; 343/100 ME, DIG. 2

[56] References Cited

U.S. PATENT DOCUMENTS

| | | | |
|---|---|---|---|
| 3,421,720 | 1/1969 | MacDonald et al. | 244/122 R |
| 3,487,445 | 12/1969 | Gluhareff et al. | 244/122 AD |
| 3,594,808 | 7/1971 | Koob et al. | 343/DIG. 2 X |
| 3,689,924 | 9/1972 | Caruso | 343/100 ME |
| 3,868,074 | 2/1975 | Hill | 244/177 |
| 3,873,050 | 3/1975 | Hill | 244/177 |
| 3,977,633 | 8/1976 | Keigler et al. | 244/169 |
| 3,979,089 | 9/1976 | Miller et al. | 244/122 AD |

OTHER PUBLICATIONS

W. J. Stone, "Performance and Design of a Vertical Seeking Steering System", Apr. 12, 1977.
Ball, W. F., "Strapped-Down Inertial Guidance: The Coordinate Transformation Updating Problems", NOTS TP 4267, Apr. 1967.
Washburn, Instrumentation in the Aerospace Industry, vol. 17, pp. 50–60, 5/10–12/1971.

*Primary Examiner*—Barry L. Kelmachter
*Attorney, Agent, or Firm*—Richard S. Sciascia; W. Thom Skeer; Kenneth G. Pritchard

[57] ABSTRACT

An attitude reference system which uses microwave radiometry to sense the orientation of a vehicle. A fundamental fact of microwave radiometry is that more natural energy emanates from the earth than from the sky. The difference in energy, which is directly proportional to temperature, can be used to estimate attitudinal position. Microwave antennas mounted on an escape vehicle, such as an aircraft ejection seat, receive energy from different directions in a base plane and from a direction perpendicular to the base plane. Vehicle orientation relative to the earth is discerned by comparing the sensed radiometric temperature received from each antenna direction, and seat guidance equipment is programmed to steer the seat in a predefined direction based upon the radiometrically sensed orientation.

9 Claims, 6 Drawing Figures

MICROWAVE RADIOMETRIC ATTITUDE REFERENCE SYSTEM

BACKGROUND OF THE INVENTION

1. Field of the Invention

The present invention pertains to attitude reference systems, and more particularly to an attitude reference system which is used to guide an escape vehicle such as an aircraft ejection seat. In a broader sense, however, the present invention could be used on any kind of vehicle or object where determining orientation relative to the earth is important or desirable.

1. Description of the Prior Art

Prior attitude sensing systems for use on aircraft ejection seats have used mechanical adjustments to align the rocket thrust axis with the center of mass of the crewmember/seat pair. This alignment is necessary to prevent excessive rotation rate of the crewmember/seat after ejection, but it does not guide the seat. Other systems employ drogue parachutes to prevent tumbling and to stabilize the crewmember/seat until the velocity has been reduced to a value where crewmember/seat separation and main parachute deployment may safely proceed.

Guided seats thus far have been described which use electrostatic sensing as a means to distinguish different orientations in space. U.S. Pat. No. 3,979,089 to Miller et al. presents one electrostatic system. Such systems, however, may behave unpredictably if an inversion in the earth's electric field occurs as near a thunderstorm. An attitude reference system can be constructed using inertial subsystems; however, inertial components require long ready times, frequent maintenance, and may depend on vulnerable aircraft systems.

Unguided seats offer little protection to pilots during inverted or high sink rate ejections near the earth's surface. Many fatalities if such out of envelope ejections occur, even though the seat functions as it is intended to function.

SUMMARY OF THE INVENTION

The present invention overcomes the deficiencies of the prior art by utilizing microwave radiometry rather than electrostatic sensing or inertial guidance to guide a steerable ejection seat toward a predefined direction regardless of aircraft attitude prior to ejection.

Three microwave antennas are arranged directed radially outward and angled 120° apart in a base plane, and a fourth microwave antenna is directed perpendicular to the base plane. The antennas are designed to sense electromagnetic energy within approximately a one gigahertz bandwidth located in the approximate frequency range of from 10 gigahertz to 37 gigahertz. This antenna structure is rigidly attached to an ejection seat.

During ejection, each antenna receives energy in proportion to the sensed radiometric temperature in the direction of orientation. An antenna oriented toward the earth senses a higher temperature than an antenna oriented toward the sky. Electronic circuitry compares the magnitudes of sensed radiometric temperatures correlated to individual antennas and steers the seat by means of servo controls and a pivotable rocket motor until the base plane antennas register equal sensed temperatures and the perpendicular antenna registers a cold sensed temperature. This situation corresponds to the seat being aligned with and seeking the zenith.

Seat propulsion system capability is such that a low altitude, inverted ejection results in a reversal in seat direction after initially clearing the aircraft so that the pilot will not impact with the earth and will reach a maximum altitude for parachute deployment.

BRIEF DESCRIPTION OF THE DRAWING

A complete understanding of the present invention and of the above and other features thereof may be gained from a consideration of the following detailed description of the preferred embodiment of a microwave radiometric attitude reference system presented in connection with the accompanying drawings, in which.

DESCRIPTION OF THE PREFERRED EMBODIMENT

The fundamentals of natural microwave radiation have been presented in several publications, such as Planck, Max, *Theory of Heat Radiation*, Translated by N. Masius 1914, Dover Publications Inc. New York, 1959; Kraus, J. D., *Radioastronomy*, McGraw-Hill Book Co. 1966; Hooper, J. O. and J. B. Seybold, *Digital Processing of Microwave Radiometric Images*, Third Annual Remote Sensing of Earth Resources Conference, University of Tennessee Space Institute, Tullahoma, Tenn Mar. 25, 1973. Only a minimal discussion of the salient features of microwave radiation germane to the development of this invention will be considered herein.

Microwave radiometry is the science of measuring natural electromagnetic radiation emanating from all materials in the environment because of the heat energy contained in the material. The electromagentic energy in the microwave portion of the spectrum is frequently referred to in terms of absolute temperature, since the microwave power emanating from a perfect radiator (blackbody) is directly proportional to the absolute temperature of the body. This radiation extends over the whole electromagnetic spectrum. In the microwave portion of the spectrum the energy emanating from the sky is less than the energy emanating from the earth. This statement is true even during adverse weather, since clouds, fog, rain, and snow are essentially transparent to selected microwave frequencies. The difference in energy emanating from the earth and sky can be used to estimate the attitudinal position of a pilot escape system.

The temperature of the microwave radiation energy emanating from the earth and sky was measured by scanning a pencil antenna beam-equipped radiometer from zenith to nadir above the ocean at a frequency of 37 GHz, which corresponds to a wavelength of 8.1 mm. Since water is very reflective, the radiometric temperature of the ocean is considerably less than the radiometric temperature of the land (290 K). Consequently, the microwave radiation signal contrast between the sky and ocean is a worst case situation for the present invention.

Further, polarization effects are more apparent over the ocean than over land because of the dielectric properties of water. The gases in the atmosphere radiate all polarizations equally. The maximum difference between the vertical and horizontal polarization components of the radiation occurs at the Brewster angle, where the water becomes a perfect radiator for vertical polarization. As an observer sweeps from nadir to horizontal, however, the horizontal polarized component decreases until the radiation from the atmosphere near the horizon and its reflection from the water surface are detected. The additional information contained in the polarized signals may be useful in estimating the escape system attitude.

Figure 1:
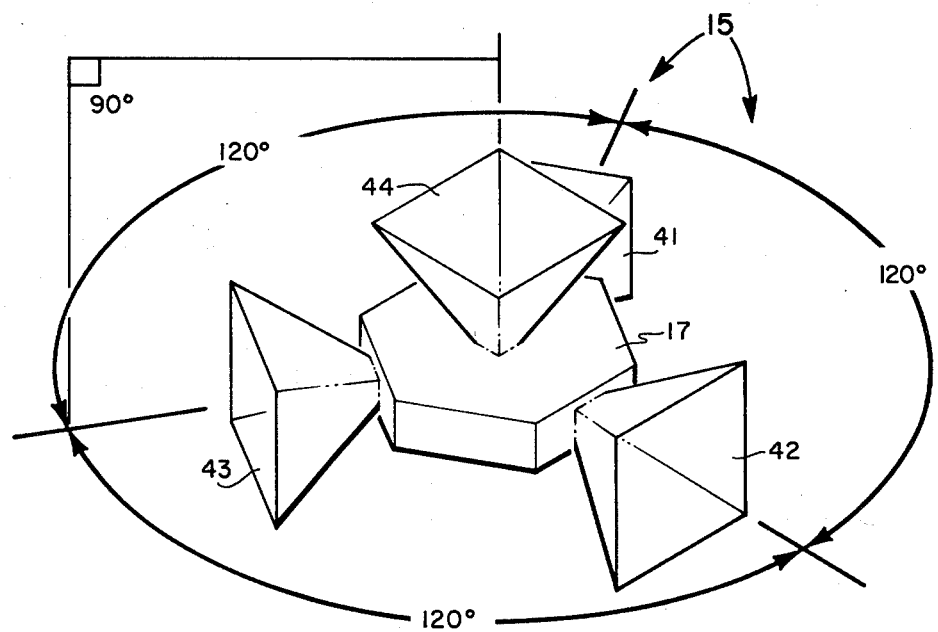
FIG. 1 illustrates a microwave antenna cluster according to the invention.

Referring now to the drawings wherein like reference characters correspond to like parts and elements throughout the several figures, there is shown in FIG. 1 a microwave antenna cluster 15. Antennas numbered 41, 42 and 43 are directed radially outward and their axes define a base plane. These antenna axes are angled 120° to one another in the base plane. Antenna 44 is directed perpendicular to the base plane; therefore, is perpendicular to each of antennas 41, 42 and 43.

Antennas 41, 42, 43, and 44 are designed according to accepted design practice to have a bandwidth of approximately one gigahertz within the range of from 10 gigahertz to 37 gigahertz. Frequencies within the range of 10 to 15 gigahertz are optimum for detecting the sensed temperature of earth or sky because of reduced sky radiation at those frequencies. The antennas feed into body 17, and microwave energy received is processed into electric signals according to standard microwave radiometric practice.

Although FIG. 1 illustrates an antenna cluster designed for linear polarization sensitivity, it should not be inferred that polarization insensitive antennas can not be used. The term "polarization" as used herein refers to the direction of the electric vector of the electromagnetic radiation. A system using polarized antennas would furnish additional information which may aid in the prediction and determination of escape seat attitudinal position.

Figure 2:
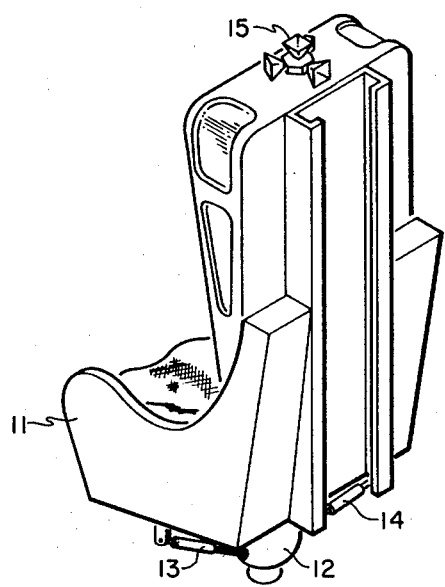
FIG. 2 illustrates an aircraft ejection seat equipped with a microwave antenna cluster according to the invention.

FIG. 2 illustrates antenna cluster 15 mounted on top of the back of aircraft ejection seat 11. Seat 11 is also equipped with rocket motor 12 which is pivotally mounted to seat 11 by means of gimbals, a ball and socket joint, or the functional equivalent. Pitch servo actuator 13 and roll servo actuator 14 control the position of rocket motor 12. Actuators 13 and 14 may be pneumatic operators, but in a maximum performance ejection seat actuators 13 and 14 preferably are hydraulic. Pressurized fluid from a blow down storage tank provides power for actuators 13 and 14, while electrically controlled valves transduce electric guidance commands to fluid pressure signals to operate actuators 13 and 14.

Figure 4:
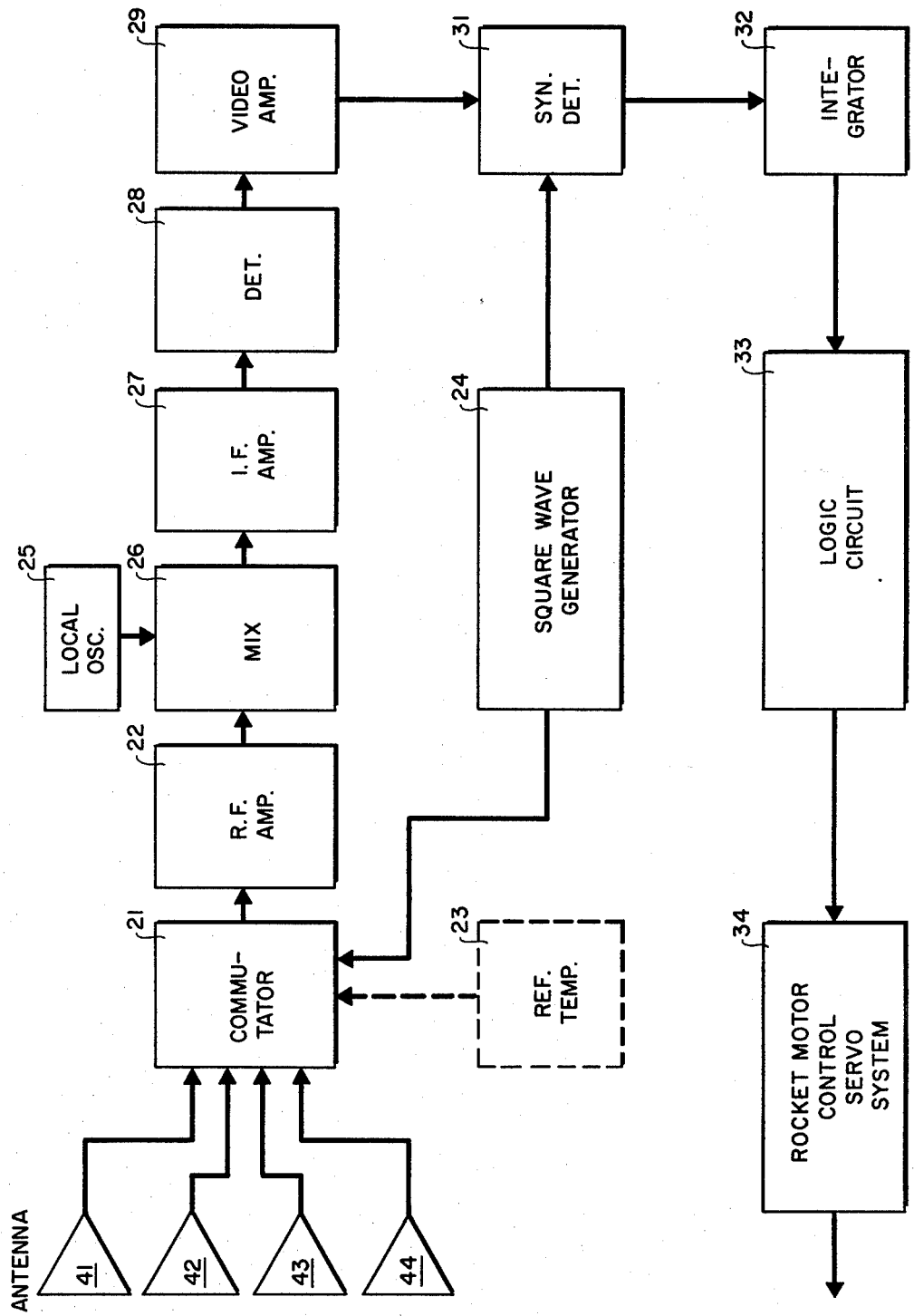
FIG. 4 is a block diagram of the electronic circuitry employed in the present invention.

FIG. 4 illustrates an electronic block diagram of the present invention. Antennas 41, 42, 43 and 44, oriented to form a base plane and a perpendicular as previously described, are each selectively connected by a commutator 21 to a radio frequency amplifier 22. A reference temperature 23 may be also connected intermittently by commutator 21. A square wave generator 24 provides an additional input to commutator 21 to provide a means for correlating different temperature inputs to antennas 41, 42, 43 and 44 respectively.

Amplified signals are sent from radio frequency amplifier 22 to a mixer 26 where an oscillating signal from a local oscilator 25 is combined with the amplified signals. This combined signal is amplified by an intermediate frequency amplifier 27 and passed to a detector 28 and a video amplifier 29.

The output of video amplifier 29 is synchronized by means of a synchronization detector 31 and input from square/wave generator 24, and passed to an integrator 32. The integrated output of inegrator 32 is proportional to the sensed radiometric temperatures from antennas 41, 42, 43 and 44. This integrated output is passed to a logic circuit 33 where guidance commands, in accordance with predetermined sensed temperature patterns, are issued to a rocket motor control servo system 34. Of course, a vehicle utilizing other propulsive means than a rocket motor would have an equivalent control system.

Figure 3:
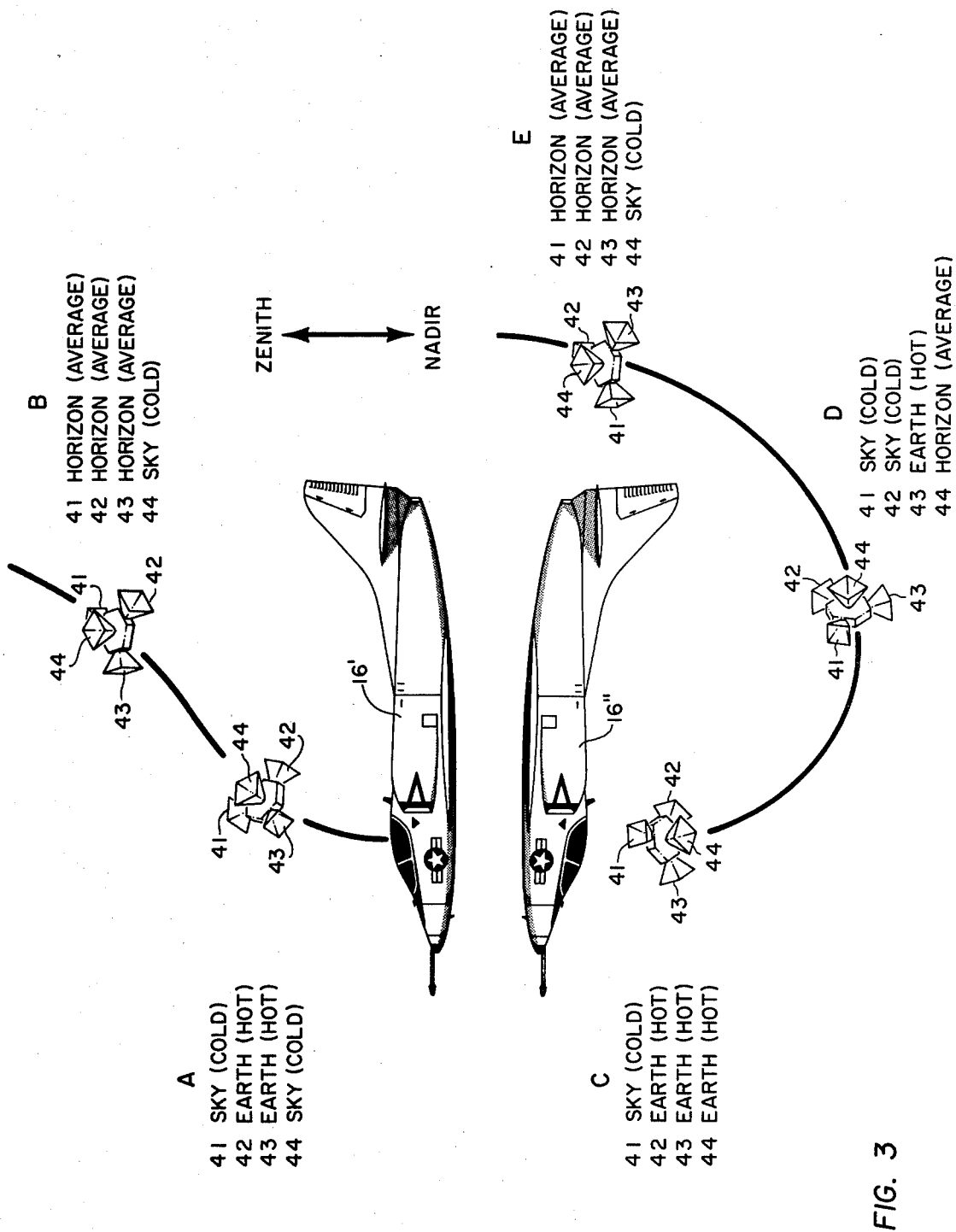
FIG. 3 illustrates the function of the present invention in a zenith hemisphere ejection and in a nadir hemisphere ejection.

FIG. 3 illustrates the difference in function of the present invention during a zenith hemisphere ejection, conditions A and B, and a nadir hemisphere ejection, conditions C, D and E. A crewmember/seat pair ejected from righted aircraft 16' needs ejection seat guidance only to make minor crewmember/seat trajectory corrections. In condition A, the differences in sensed temperatures between antennas 41 and 42, and 41 and 43 cause the system to adjust until in condition B, antennas 41, 42 and 43 all sense average radiometric temperatures. A crewmember/seat pair ejected from inverted aircraft 16" needs major guidance corrections to correctly orient the crewmember/seat pair. In conditions C and D the sensed radiometric temperatures indicate off zenith orientation, which causes the responding logic circuitry servo controls to steer the rocket motor and drive the seat toward zenith alignment condition E which is equivalent to condition B.

Figure 5:
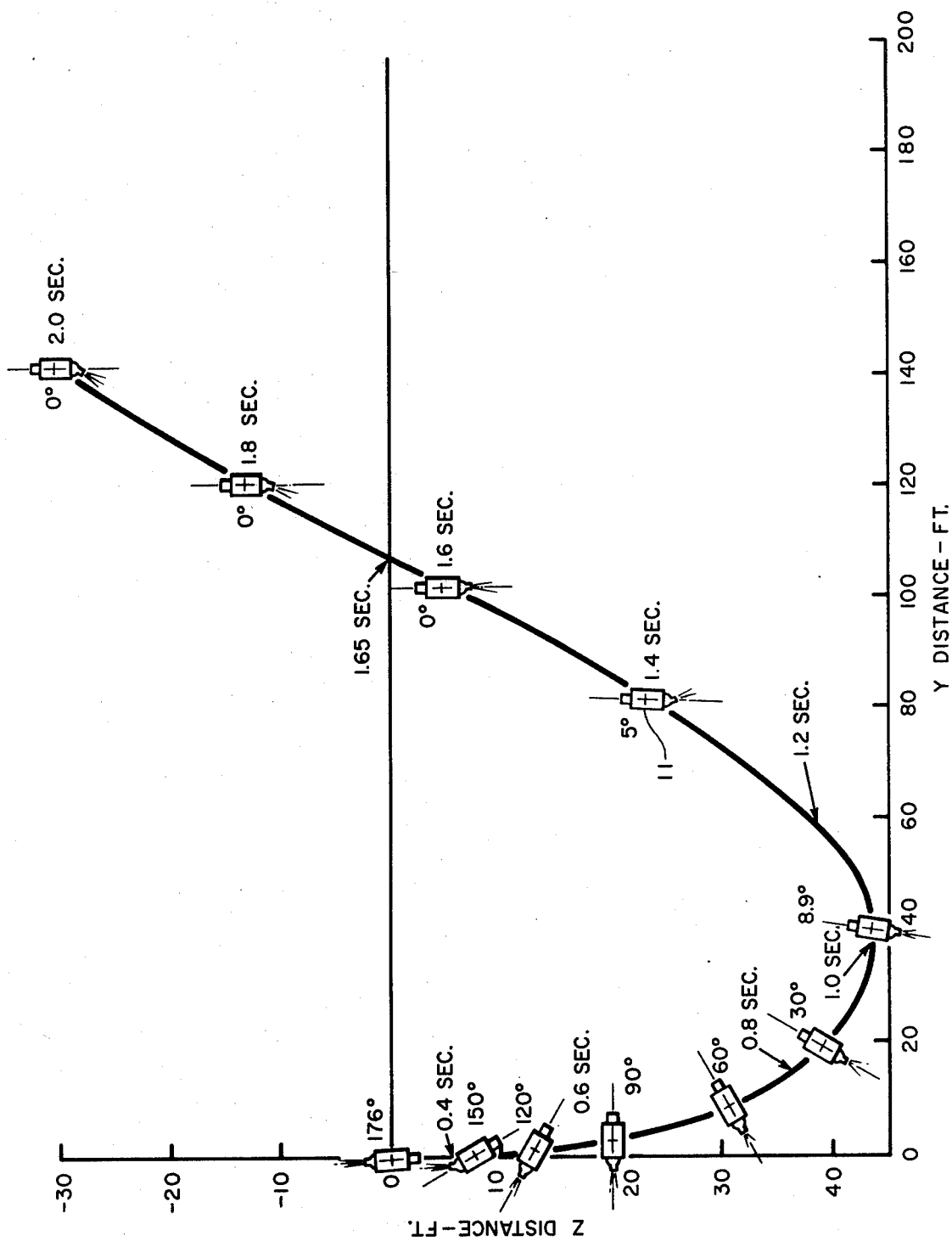
FIG. 5 illustrates the position and trajectory of a crew member/seat pair equipped with the present invention in an inverted ejection at 150 knots air speed with zero sink rate.
Figure 6:
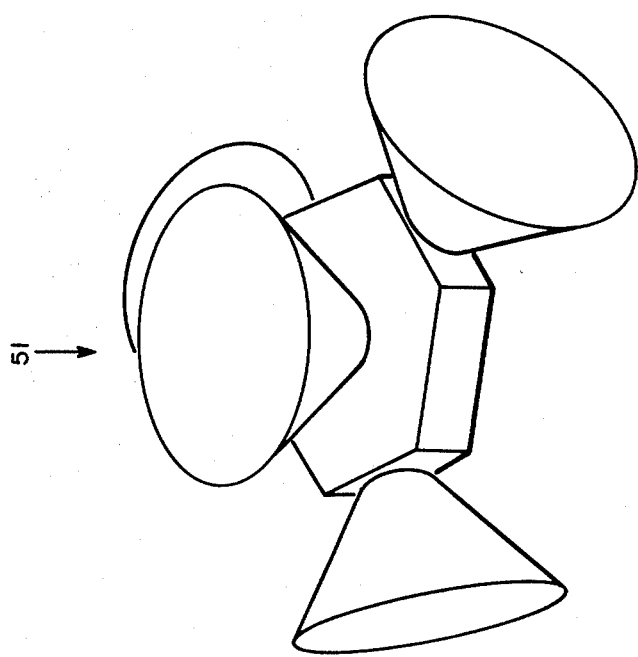
FIG. 6 illustrates an antenna cluster 51 having non polarized antennas.

FIG. 5 illustrates a typical inverted ejection crewmember/seat trajectory, assuming a zero aircraft sink rate and 150 knot airspeed. The typical positions and orientations of ejection seat 11 are shown as a function of time after ejection in seconds, and the trajectory profile in lateral horizontal travel versus altitude is shown.

The trajectory and orientations shown in FIG. 5 may be performed by a lateral rolling maneuver or by a pitching maneuver, depending upon the aircraft attitude at ejection and upon any preprogrammed instructions built into system logic. A combination of pitching and rolling may be the optimum maneuver in a given situation to provide aircraft structure clearance by the crewmember/seat pair.

Logic circuit 33 utilizes the Crowder-Hession direction cosine update algorithm to compute the nearest vertical. If the system is accurate to within tenths of degrees, it is adequate, since crewmember survival, rather than long distance navigation, is the goal; and rocket burn time is usually short, typically less than two seconds. The Crowder-Hession algorithm is described various places in the open literature. For example:

Massachusetts Institute of Technology, MIT Instrumentation Laboratory. Analysis of a Transformation Computer Used With a Gimballess IMU, by R. M. Hession. Cambridge, Mass., MIT, January 1965. (MIT Instr. Lab. Report No. R-481.)

Transformation Computer for Strapped-Down Guidance Systems, by L. F. Crowder. Sunnyvale, Calif., LMSD, Mar. 17, 1964. (GTM 83.)

U.S. Naval Ordnance Test Station. Strapped-Down Inertial Guidance-The Coordinate Transformation Updating Problem, by William F. Ball. China Lake, California., U.S. Navy, April 1967. (N.O.T.S. TP 4267.)

Instrument Society of America, Instrumentation In The Aerospace Industry, Volume 17, edited by B. Washburn. Pages 50–60, A High Speed Processor For Strapdown Navigation System Computations, by James Kent Mathewes, Raytheon Company, Sudbury, Massachusetts. Proceedings of the Seventeenth International ISA Aerospace Instrumentation Symposium, May 10-12, 1971 Las Veges, Nevada.

The basic concept of the present invention is the fact, well known in microwave radiometry, that radiometric sky temperatures are always significantly less than radiometric earth temperature if a proper choice of radiometric frequency is made. Antenna 44, measuring either hot or cold relative to a reference temperature 23, determines whether the seat is oriented toward the zenith or nadir hemispheres respectively. Antennas 41, 42 and 43 are rotated to achieve average readings corresponding to the antenna base plane being horizontal by causing the seat to seek either the nearest vertical or the farthest vertical, depending upon hemispherical orientation at ejection.

Proper frequency selection will reduce problems of radio frequency interference. Frequencies of 10–15 gigahertz are preferred because of reduced sky radiation, however, engineering simulations at approximately 37 gigahertz provide useful information on system performance during overcast or bad weather ejections.

What is claimed is:

1. An attitude seeking ejection seat, comprising:
    a frame configured to cradle the body of a user;
    a microwave radiometric sensing means attached to said frame for receiving energy from at least three different coplanar directions which define a base plane and from at least one direction perpendicular to said base plane;
    processing means communicating with said microwave radiometric sensing means for generating signals which are proportional to the energy intensities received from each coplanar and perpendicular direction;
    computing means communicating with said processing means for generating guidance commands in response to said proportional signals;
    pivotable propulsion means for providing propulsive thrust to said ejection seat, said propulsion means being attached to said frame; and
    control means for pivoting said propulsion means in response to said guidance commands.

2. An attitude seeking ejection seat as set forth in claim 1 wherein said microwave radiometric sensing means comprises a plurality of directional, polarized microwave antennas, each configured for maximum sensitivity over a one gigahertz bandwidth within the frequency range of from 10 gigahertz to 37 gigahertz.

3. An attitude seeking ejection seat as set forth in claim 1 wherein said computing means is configured to employ the Crowder-Hession direction cosine update algorithm.

4. An attitude seeking ejection seat as set forth in claim 1 wherein said computing means is configured to generate guidance commands which direct said control means to cause said pivotal propulsion means to power said ejection seat toward a predefined direction.

5. An attitude seeking ejection seat as set forth in claim 4 wherein said predefined direction is the zenith direction.

6. An attitude reference system for use in guiding a vehicle, comprising:
    an antenna cluster having a plurality of polarized microwave radiometric sensors configured to receive energy from at least three different coplanar directions which define a base plane and from at least one direction perpendicular to said base plane;
    processing means communicating with said plurality of polarized microwave radiometric sensors for generating signals which are proportional to the energy intensities received by said plurality of polarized microwave radiometric sensors from each coplanar and perpendicular direction; and
    computing means communicating with said processing means for generating guidance commands in response to said proportional signals, which guide said vehicle toward a predefined attitude.

7. An attitude reference system as set forth in claim 6 wherein said polarized microwave radiometric sensors comprise three coplanar antennas, each coplanar antenna forming an angle of 120° with each of the other coplanar antennas and a fourth antenna directed 90° to each of said coplanar antennas.

8. An attitude reference system as set forth in claim 6 wherein said microwave antennas are configured for maximum sensitivity over a one gigahertz band width within the frequency range of from 10 gigahertz to 37 gigahertz.

9. An attitude reference system as set forth in claim 6 wherein said vehicle is a steerable aircraft ejection seat.

* * * * *